3,557,417
TOOL HOLDER
John P. Kollar, Trumbull, Conn., assignor of one-half to Thomas J. Kollar, Milford, Conn.
Filed July 11, 1968, Ser. No. 744,051
Int. Cl. B26d 1/00
U.S. Cl. 29—96
6 Claims

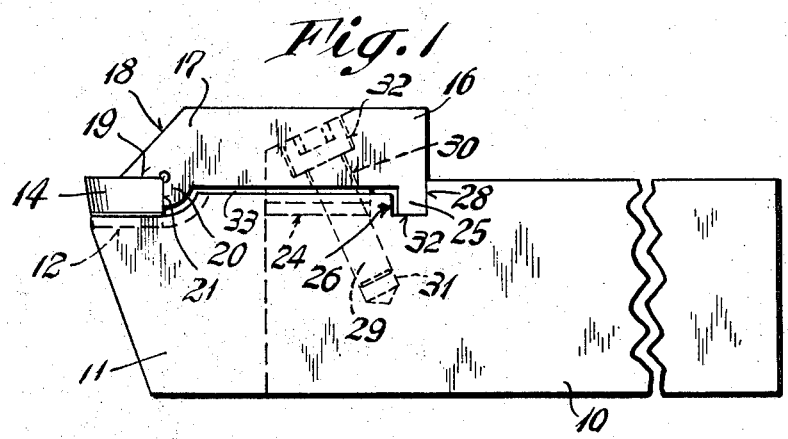
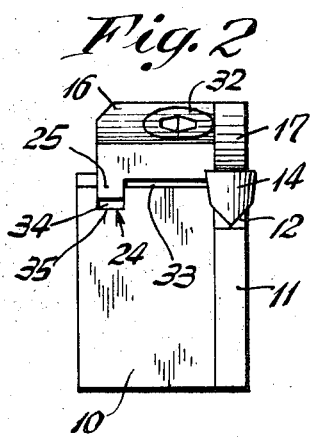
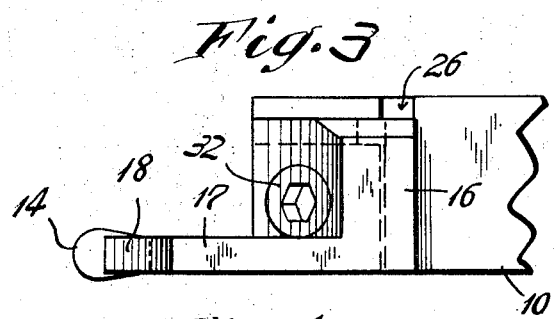
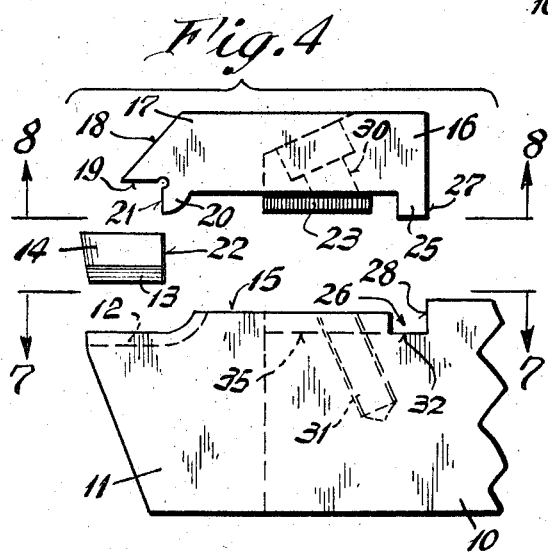
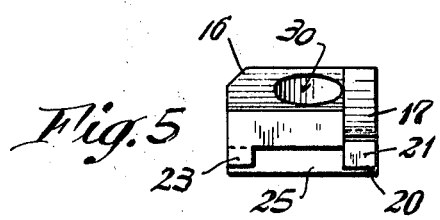
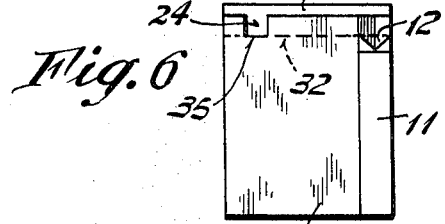
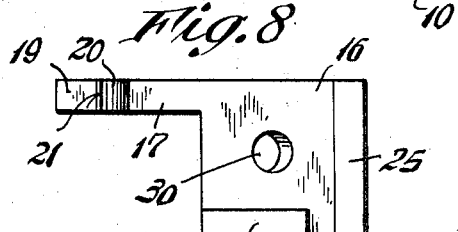
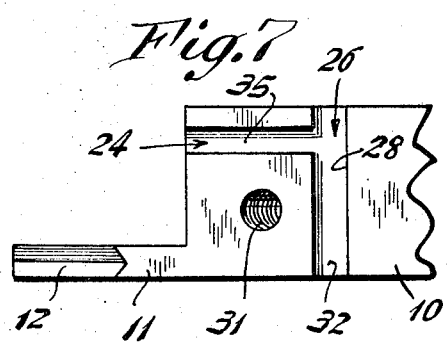
INVENTOR.
John P. Kollar United States Patent Office 3,557,417
Patented Jan. 26, 1971

ABSTRACT OF THE DISCLOSURE

A tool holder shank having an integral blade is provided with a clamp having a blade to hold a tool bit or insert, the shank having transverse and longitudinal grooves receiving transverse and longitudinal ribs on the clamp to control the position of the clamp on the shank when the clamp is secured to the shank with a bit between the blades by a single screw passing through the clamp and into the shank, the blade on the shank having a V groove and a bit having a bottom V-formation to align and hold the bit on the shank blade.

---

This invention relates to a tool holder for lathes and the like, and more particularly to an improved shank and clamp combination whereby a tool bit may be securely clamped to the holder and held against displacement from proper position when performing work which may include form-grooving, cut off, side cutting, face-grooving, etc. operations.

The tool holder of the present invention is particularly useful in supporting for use relatively short tool bits which have only one cutting end and which are not intended for resharpening, except in some situations in which some slight resharpening may be economically justified.

When the tool bit is to be discarded after its cutting edge is worn, it is desirable to make the tool bit as short as possible, and hence it is an object of this invention to provide a tool holder which can receive and securely hold an extremely short tool bit against lateral as well as end thrusts.

A feature of the tool of this invention may, of course, be incorporated in tool holders for accommodating longer or conventional tool bits.

A further feature of this invention is the provision of positive acting means for locating and securing the clamp to the tool bit in predetermined position on the shank, such means including a single screw which is inclined downwardly and rearwardly to force the clamp against stop means on the shank as an incident to the fastening of the clamp to the shank.

Other features and advantages will hereinafter appear.

In the accompanying drawings:

FIG. 1 is a side elevation of a tool holder made in accordance with this invention showing a tool bit clamped in operative position.

FIG. 2 is an end view of the tool and bit shown in FIG. 1.

FIG. 3 is a top plan view of the forward end of the tool holder and bit shown in FIGS. 1 and 2.

FIG. 4 is an exploded view of parts of the shank, the clamp, and the tool bit.

FIG. 5 is a front view of the clamp only.

FIG. 6 is a front view of the shank only.

FIG. 7 is a top plan view taken on line 7—7 of FIG. 4 of the forward end aof the shank.

FIG. 8 is a bottom plan view taken on line 8—8 of FIG. 4 of the clamp.

As shown in FIGS. 1 and 2, the shank has a body portion 10 adapted to be supported in a tool support of a lathe or the like. The forward end of the shank has a narrow blade 11 integral with and extending beyond the forward end of the body portion 10.

The blade 11 has on its upper surface a V-shaped groove 12 adapted to receive a V-formation 13 on a tool bit 14. The groove 12 is slightly longer than the axial length of the bit and, for convenience of manufacture, the groove curves upwardly to the top surface 15 of the blade 11.

Superposed on the shank body 10 is a clamp 16 shown in FIGS. 5 and 8, and this is positioned on the shank body 10 by means referred to below so that a blade 17 integral with the clamp 16 is vertically aligned with the blade 11 on the shank.

As will be seen from FIGS. 1 and 4, the blade 17 at its front end has a sloping face 18 to provide for chip clearance and has a flat horizontal surface 19 which engages a substantial portion of the top surface of the tool bit 14 centered from the V-groove 12 in the blade 11 when the clamp 16 is secured to the body 10. The blade 16 has a depending portion 20 having a stop face 21 to be engaged with the back end surface 22 of the tool bit.

To accurately locate the clamp 16 on the body 10 against lateral movement thereon, which of course might otherwise occur due to lateral pressure transmitted through the tool bit while working, the clamp 16 is provided with a rib 23 and the shank is provided with a groove 24. The rib 23 and groove 24 are made to have a close yet sliding fit to eliminate any appreciable lost motion which would permit the clamp to skew on the body 10.

To accurately locate the clamp 16 on the body 10 in desired position to resist movement of the clamp axially of the shank body 10, the clamp 16 is provided with a transverse rib 25 which extends into a transverse groove 26 in the body 10. Since the function of the rib 25 is to resist axial movement of the clamp 16, to facilitate the mounting of the clamp on the body, the groove 26 may be slightly wider than the width of the rib 25, the surface 27 of the latter and the surface 28 of the groove 26 being the means for resisting the axial movement of the clamp away from the front of the shank body.

The clamp 16 and body 10 of the shank are secured together by a screw 29 in the clamp which passes through a hole 30 in the clamp and is threaded in a hole 31 in the body 10. The body 10 may be countersunk to freely receive the head 32 of the screw 29.

In the broader aspects of this invention, the holes 30 and 31 may be perpendicular to the axis of the body 10 to fasten the clamp 16 to the body, but this would require extreme precision in drilling the holes and would not make correction for any tolerances in the manufacture of the parts.

To avoid this, the axes of the holes 30 and 31 are inclined downwardly and rearwardly with the result that when the body and clamp are assembled with the tool bit inserted between the blades 11 and 17 and the screw 29 is driven home, rearward pressure on the clamp 16 will take up any lost motion axially of the body and force the surface 27 of the rib 25 against the surface 28 of the groove 26. Thus, axial force applied to the tool bit 14 will be transferred to the portion 20 of the clamp and from the latter to the rib 25 and surface 28 of the groove 26.

The screw 29 is located axially between the front end of the blade 17 and the rib 25 so that when pressure is applied by the screw, both ends of the damp will be forced down, the surface 19 of the blade 17 against the tool bit 14 and the rib 25 on the clamp against the bottom 32 of the groove 26 of the shank. The movement is made possible by providing clearance indicated at 33 between the clamp and the body and clearance 34 between the rib 23 and the bottom 35 of the groove 24. Therefore, the vertical component of the pressure applied to the screw 29 is applied solely to the tool bit 14 by the blade surface 19 and to the bottom 32 of the groove 26 by the rib 25.

The screw 29 and holes 30 and 31 are located within the triangle outlined by the surface 19 on the blade 17 and the ends of the rib 25 so that the force which is applied to the clamp is distributed to these three points, thereby providing a stable three point engagement of the clamp with the body and bit.

Variations and modifications may be made within the scope of the claims and portions of the improvements may be used without others.

I claim:

1. A tool holder comprising a shank having an integral blade; a clamp having an integral blade adapted to align with an overlie the blade on the shank to clamp a bit between them, the blade on the clamp having a shoulder positioned to engage the back surface of the bit held between the blades to act as a backstop for the bit; means for maintaining the vertical alignment of the blades but permitting axial movement of the clamp on the shank; means for limiting the axial movement of the clamp inwardly of the shank; and means for securing the clamp to the shank and for forcing the clamp to its said limit of movement.

2. A tool holder as defined in claim 1 in which the means for securing the clamp to the shank and for forcing the clamp to said limit of movement comprises a single screw which passes through the clamp and is threaded in a hole in the shank, the screw and the hole being inclined downwardly and rearwardly in the shank to force the clamp to move firmly against the bit and simultaneously force means on the clamp against said means for limiting the axial movement of the clamp to locate and secure the clamp at said limit of its movement.

3. A tool holder comprising a shank, a blade on the shank having a V groove to receive a V-formation on a bit to support the latter in cutting position, a clamp having a blade for holding the bit in said cutting position on the blade on the shank, the blade on the clamp having a shoulder positioned to enage the back surface of the bit held between the blades to act as a backstop for the bit, the clamp and shank having the cooperating guide to maintain the clamp blade central over the bit yet not restricted axial movement of the clamp on the shank, and the shank and clamp having cooperating stop surfaces to abut and control a determinate position of the clamp axially on the shank, and screw means for securing the clamp to the shank.

4. A tool holder as defined in claim 3 in which the screw means includes a single screw which passes through the clamp and is threaded in a hole in the shank, said hole and screw means being inclined downwardly and rearwardly in the shank to force the clamp to move firmly against the bit and simultaneously force means on the clamp against said means for limiting the axial movement of the clamp to locate and secure the clamp at said limit of movement.

5. A tool holder as defined in claim 4 in which said guide surfaces comprise a rib and a groove, one on the clamp and the other on the shank, and said stop surfaces comprise a rib and a groove, one on the clamp and the other on the shank.

6. A cutting tool comprising a shank having an integral blade having on its upper surface an approximately V-shaped longitudinal groove, a bit having a planar top surface and a bottom surface provided with a longitudinal V-shaped rib to rest on and fit in said V-shaped groove in the blade on the shank, a clamp having a blade having a planar bottom surface adapted to overlie the blade on the shank to clamp the bit between itself and the blade on the shank, the blade on the shank having a depending shoulder positioned to be engaged by the back surface of the bit to act as a backstop for the bit, means for limiting the axial movement of the clamp inwardly of the shank, and means for securing the clamp to the shank and forcing the blade on the clamp against the bit and the bit against the blade on the shank.

References Cited

UNITED STATES PATENTS

| | | | |
|---|---|---|---|
| 1,318,830 | 10/1919 | Bartlett | 29—96 |
| 1,629,667 | 5/1927 | Knipple | 29—96 |
| 2,838,827 | 6/1958 | Wright | 29—96 |
| 2,964,833 | 12/1960 | Novkov | 29—95 |
| 3,125,798 | 3/1964 | Stein | 29—98 |
| 3,205,558 | 9/1965 | Stier | 29—96 |

HARRISON L. HINSON, Primary Examiner

PO-1050
(5/69)

UNITED STATES PATENT OFFICE
CERTIFICATE OF CORRECTION

Patent No. 3,557,417    Dated January 26, 1971

Inventor(s) John P. Kollar

It is certified that error appears in the above-identified patent and that said Letters Patent are hereby corrected as shown below:

Column 1, line 67, "a" should be cancelled.

Column 2, line 68, "damp" should read - <u>clamp</u> --.

Column 3, line 19, "an" should read -- and --; line 44, "enage" should read -- engage --; line 46, "the" (second occurrence) should be cancelled; same line, after "guide" should be inserted -- surfaces --.

Column 4, line 2, "stricted" should read -- strict --.

Signed and sealed this 8th day of June 1971.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,557,417  Dated January 26, 1971

Inventor(s) John P. Kollar

It is certified that error appears in the above-identified patent and that said Letters Patent are hereby corrected as shown below:

In the title, "assignor of one-half to Thomas J. Kollar, Milford, Conn." should be cancelled.

Signed and sealed this 12th day of October, 1971.

(SEAL)
Attest:

EDWARD M. FLETCHER, JR.
Attesting Officer

ROBERT GOTTSCHALK
Acting Commissioner of Patents